(12) United States Patent
Kikumori et al.

(10) Patent No.: US 6,435,567 B2
(45) Date of Patent: Aug. 20, 2002

(54) COUPLING STRUCTURE FOR TUBE

(75) Inventors: Yasuhiro Kikumori; Yoshiyuki Koizumi, both of Osaka (JP)

(73) Assignee: Totaku Industries, Inc., Osaka (JP)

( * ) Notice: Subject to any disclaimer, the term of this patent is extended or adjusted under 35 U.S.C. 154(b) by 0 days.

(21) Appl. No.: 09/760,729

(22) Filed: Jan. 17, 2001

(30) Foreign Application Priority Data

Jan. 18, 2000 (JP) ........................................ 2000-009265

(51) Int. Cl.[7] ................................................. F16L 39/00
(52) U.S. Cl. ........................ 285/319; 285/903; 285/921
(58) Field of Search ................................ 285/903, 319, 285/921, 140.1, 210

(56) References Cited

U.S. PATENT DOCUMENTS

| | | | | |
|---|---|---|---|---|
| 4,836,580 A | * | 6/1989 | Farrell | 285/319 |
| 4,989,905 A | * | 2/1991 | Rajecki | 285/319 |
| 5,042,844 A | * | 8/1991 | Iida | 285/921 |
| 5,112,086 A | * | 5/1992 | Gruber et al. | 285/903 |
| 5,356,181 A | * | 10/1994 | Shirogane et al. | 285/903 |
| 5,407,236 A | * | 4/1995 | Schwarz | 285/319 |
| 6,199,920 B1 | * | 3/2001 | Neustadtl | 285/903 |
| 6,209,929 B1 | * | 4/2001 | Ikegami et al. | 285/903 |
| 6,237,969 B1 | * | 5/2001 | Amatsutsu | 285/903 |
| 6,254,145 B1 | * | 7/2001 | Schwarz et al. | 285/319 |

* cited by examiner

*Primary Examiner*—Eric K. Nicholson
(74) *Attorney, Agent, or Firm*—McGinn & Gibb, PLLC

(57) ABSTRACT

A coupling structure for a tube having first and second tube members coupled to each other includes a come-out preventing member adapted to be held at an outer periphery of the first tube member and restricted in its movement in a longitudinal direction of the first tube member at a tip end portion on a coupling side of the first tube member, and an engaging member adapted to protrude from an end portion on a coupling side of the second tube member. The come-out preventing member and the engaging member are respectively provided with first engaging portions and second engaging portions to engage the come-out preventing member and the engaging member to each other and to prevent the first and second tube members from being separated.

20 Claims, 13 Drawing Sheets

COUPLING STRUCTURE FOR TUBE

BACKGROUND OF THE INVENTION

The present invention relates to a coupling structure for a tube which is used, for example, at the time of burying a cable such as a wire cable in the ground, for attaching a protection tube used for protecting the cable to a hand hole made of concrete, and also includes a coupling structure for a tube used for coupling various types of tubes.

Conventionally, as a means for attaching a cable protection tube made of composite resin to a hand hole, there is provided such an arrangement shown in FIG. 13 that a through hole 52 is provided at the side wall 51 of the hand hole made of concrete which is provided in advance, then the tip end of a protection tube 53 is inserted into the through hole 52, and mortar 54 is filled into a space between the protection tube 53 and the through hole 52 to thereby fix the protection tube. A reference numeral 55 depicts a bellmouth attached to the tip end of the protection tube 53.

However, this method requires troublesome procedures such as the hole making procedure at a construction site, the filling procedure of mortar etc. Further, the next procedure can not be started until the mortar thus filled is hardened. In this manner, this method has a defect that the troublesome procedure and much time is required.

As a means for solving such a problem, Japanese Patent Examined Publication No. Sho. 60-14568 discloses such an arrangement that, at the time of providing a hand hole, a conduit opening member provided separately from a protection tube at the outer periphery thereof is buried in advance such that the end portion thereof protrudes on the outer side of the hand hole, and the protruded end portion is coupled with the end portion of the protection tube by using another joint tube. In this case, as each of the protection tube and the conduit opening member, a spiral corrugated tube with the same diameter having a spiral projection portion on the outer periphery thereof is employed. The joint tube engages with the protection tube and the conduit opening member so as to extend both of them by using the spiral projection portions thereof.

However, the method of the aforesaid publication also requires a procedure of screwing the joint tube into the protection tube and the conduit opening member. In this case, it is required to hold the protection tube and the conduit opening member so as to be arranged in a straight line during the screwing procedure. In particular, since the protection tube is very long and has been wound in a roll shape before installation, the protection tube likely holds its rolled shape, it is difficult to hold the protection tube and the conduit opening member in a straight shape.

Further, since the protection tube and the conduit opening member are coupled simply by means of the joint tube, there is a disadvantage that water in the ground likely enters into the gap therebetween.

SUMMARY OF THE INVENTION

Accordingly, an object of the invention is to provide a tube coupling structure which can eliminate the aforesaid conventional drawbacks, can perform simply in a short time a coupling procedure at the time of coupling tubes like a case of coupling a conduit opening member buried in a hand hole with a cable protection tube, and is excellent in watertightness.

In order to solve the aforesaid problem, the invention is characterized by including a come-out preventing member which is held at an outer periphery of a first tube member of a pair of tube members to be coupled to each other in a state being restricted in its movement in a longitudinal direction of the first tube member at a tip end portion on a coupling side of the first tube member, and an engaging member protruded from an end portion on a coupling side of a second tube member which is the other of the pair of tube members, wherein the come-out preventing member and the engaging member are respectively provided with engaging portions which act to engage the come-out preventing member and the engaging member to each other to prevent the first and second tube members from being separated to each other in a state where the come-out preventing member is pushed into the engaging member, and wherein at least one of the engaging portions has elasticity with respect to a radial direction of the tube member or elastically supported so that the engaging portions are placed in an engaged state to each other due to the elasticity of the at least one of the engaging portions when the come-out preventing member is pushed into the engaging member.

In the aforesaid arrangement, it is preferable to have an arrangement in which the engaging member is threadedly engaged with the second tube member so as to be separatable from the second tube member by rotating the engaging member relative to the second tube member while the engaging member and the come-out preventing member are being engaged to each other. With this arrangement, the coupling state between the first and second tube members can be easily released by the rotation thereof even after the coupling in the longitudinal direction.

In the above-mentioned structure, it is advantageous that a packing is provided which is housed in a packing housing portion of the second tube member in a state where the packing is fitted on an outer periphery of the tip end portion on the coupling side of the first tube member, and the come-out preventing member is attached to an inner side from the packing along the longitudinal direction of the first tube member.

In this case, it is further advantageous that the come-out preventing member abuts its tip end against an end surface of the packing to thereby support the packing from a rear portion side thereof along a pushing direction when the packing is pushed within the housing portion.

Further, it is considered that the first tube member is a spiral corrugated tube having a spiral-shaped projection on the outer periphery thereof, and the spiral corrugated tube is arranged in a manner that the come-out preventing member meshes with the spiral-shaped projection to restrict movement or the come-out preventing member in the longitudinal direction of the tube member.

According to this, there is provided an arrangement that the engaging member is arranged in a manner that it is meshed with and attached to the end portion on the coupling side of the second tube member and separated from the end portion on the coupling side by releasing the meshed state.

Further, in the present invention, there may be provided an arrangement that the fist tube member is a cable protection tube for an electric wire cable etc. buried within ground, and the second tube member is a conduit opening member which is buried in a side wall of a hand hole made of concrete and serves to introduce the cable passed through the first tube member within the hand hole.

In this invention, the tube members include not only members generally called tubes but also other tubular members such as joint tubes.

DETAILED DESCRIPTION OF THE PREFERRED EMBODIMENTS

Figure 1:
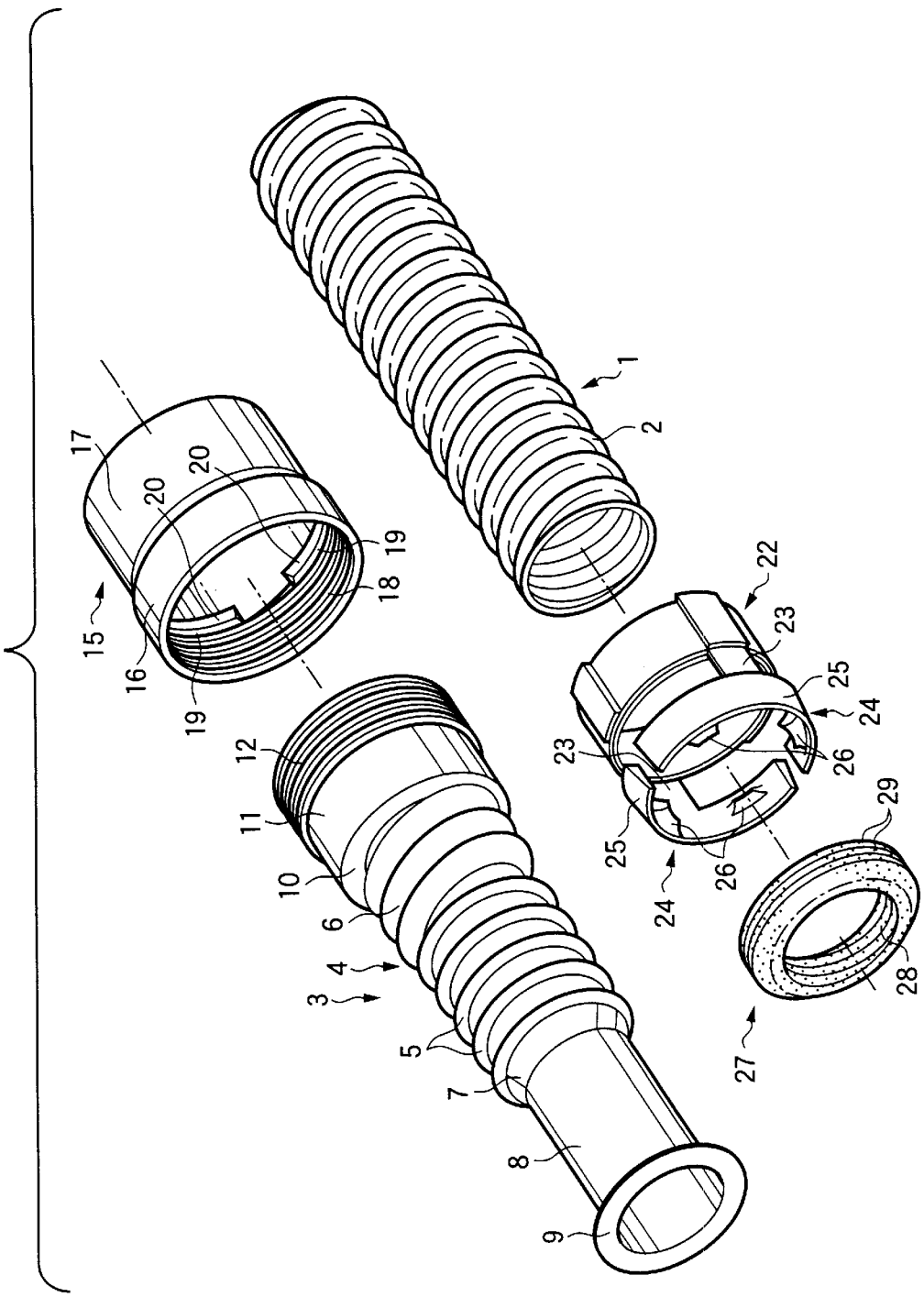
FIG. 1 shows an exploded perspective view of the coupling portion between a conduit opening member and a cable protection tube according to an embodiment of the invention.

An embodiment described below shows a case where the invention is implemented in the coupling between a conduit opening member for a hand hole and a protection tube. In FIG. 1, 1 depicts the protection tube serving as the first tube member of the invention. The protection tube 1 is a corrugated tube made of hard composite resin having a spiral-shaped projection portion 2 on the outer periphery thereof. In general, the protection hole is brought into a construction site in a long rolled state and buried into the ground.

3 depicts a conduit opening member for burying a hand hole serving as the second tube member of the invention. The main body portion 4 of the conduit opening member 3 is configured in a manner that one end portion side thereof is formed as a corrugated tube having many annular projection portions 5 on the outer periphery thereof and the other end portion thereof is formed as a spiral corrugated tube having a spiral projection portion 6 on the outer periphery thereof. A straight portion 8 with a small diameter is formed at the tip end of the main body portion on the annular projection portions 5 side through a tapered step portion 7. A bellmouth 9 is formed at the tip end of the straight portion. On the other hand, a large-diameter cylindrical portion 11 is formed at the tip end of the main body portion on the projection portion 6 side through a step portion 10 which elects almost perpendicularly from the outer periphery of the main body portion. A male-screw 12 is formed on the pouter periphery of the tip end portion of the large-diameter cylindrical portion 11. As described later, a hollow portion within the large-diameter cylindrical portion 11 serves as a packing housing portion 13.

15 depicts an engagement member of the invention which is configured entirely by a large diameter portion 16 and a small diameter portion 17 to form a step-type short cylindrical shape and is also formed by hard composite resin like the conduit opening member 3. A female screw 18 fitting to the male screw 12 is formed on the inner periphery of the large diameter portion 16. Further, a plurality of engagement projections 19,19 are formed with an interval along the circumferential direction integrally on the inner peripheral surface at the end portion of the small diameter portion 17 on the large-diameter portion side. As described later, each of the projections 19 is configured almost in a V shape in a manner that one surface at opposite side to the large diameter portion 16 is formed as a gentle slanted surface 20.

22 depicts a supporting ring serving as a supporting member of the invention. The supporting ring has an inner diameter which is slightly larger than the maximum outer diameter of the protection tube 1 and is formed in a straight shape so as not to incline to the axial direction in a state that the supporting ring is fitted on the outer periphery of the protection tube 1. A pair of supporting pieces 23, 23 opposing to the radial direction are protrusively provided on and integrally with the one end side of the supporting ring 22. These supporting rings 22,22 have a thin thickness and elasticity, and further are integrally and continuously provided at the tip ends thereof with come-out preventing members 24 which are bent in the same direction as the circumferential direction of the supporting rings 22. The outer periphery of each of these come-out preventing members 24 is formed as a slanted surface 25 which becomes lower toward the tip end surface at the opposite side of the supporting rings 22.

Further, two projections 26,26 are provided on the inner peripheral surface of each of the come-out preventing members 24,24 along an imaginary spiral passing on the inner peripheral surface. This imaginary spiral has the same pitch as the spiral formed on the outer periphery of the protection tube 1. These come-out preventing members are arranged in a manner that the come-out preventing members can mesh with the outer side of the protection tube 1 by fitting the projections 26,26 in the groove between the projection portions 2 of the protection tube 1 and rotating the come-out preventing members. These come-out preventing members 24,24 also have a thin thickness and have such elasticity that they bend inward when applied with force from the outer periphery side. These supporting rings 22 and the come-out preventing members 24 are usually formed integrally by hard composite resin.

27 depicts a packing which is formed by soft rubber in an annular shape as a whole. The packing is provided on the inner periphery thereof with spiral groove 28 which fits to the projection portion 2 of the protection tube 1 and further provided on the outer periphery thereof with a plurality of annular finny pieces 29 which are disposed with an interval in the axial direction.

Figure 2:
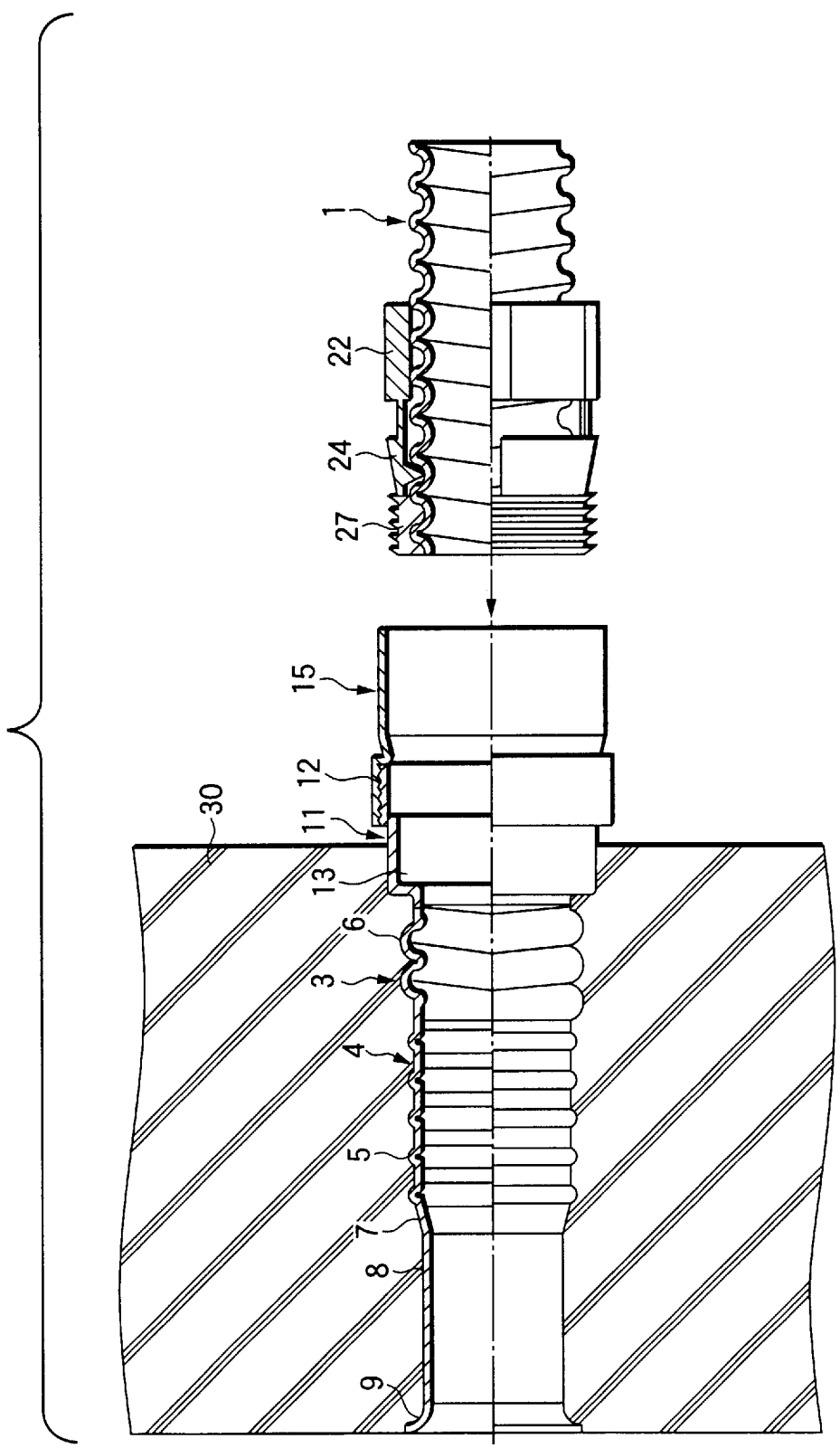
FIG. 2 shows a sectional view showing a state just before the coupling of the protection tube to the conduit opening member buried in a hand hole.

A method of coupling to the hand hole by using the protection tube 1 and the conduit opening member 3 thus configured will be explained. First, as shown in FIG. 2, at the time of providing concrete at a hand hole side wall 30, the conduit opening member 3 is buried in a manner that the opening portion of the bellmouth 9 thereof almost fits to the inner wall surface of the side wall 30 and at least the male screw 12 of the large-diameter cylindrical portion 11 at the opposite side of the bellmouth exposes from the outer wall surface of the side wall 30. The engaging member 1S is attached to the large-diameter cylindrical portion 11 by meshing the female screw 18 of the engaging member with the male screw 12. This attachment procedure may be performed before or after the provision of the concrete.

Figure 3:
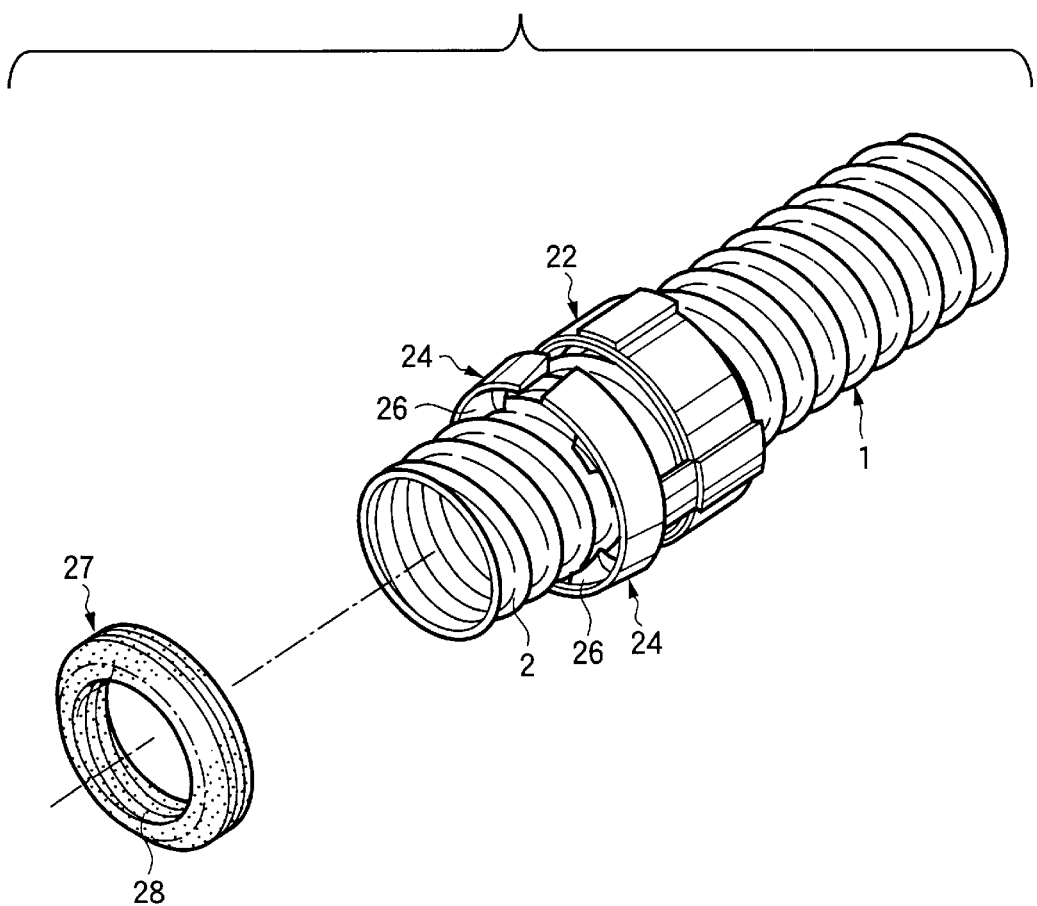
FIG. 3 shows a perspective view showing a state just before a packing is attached to the tip end of the protection tube.
Figure 4:
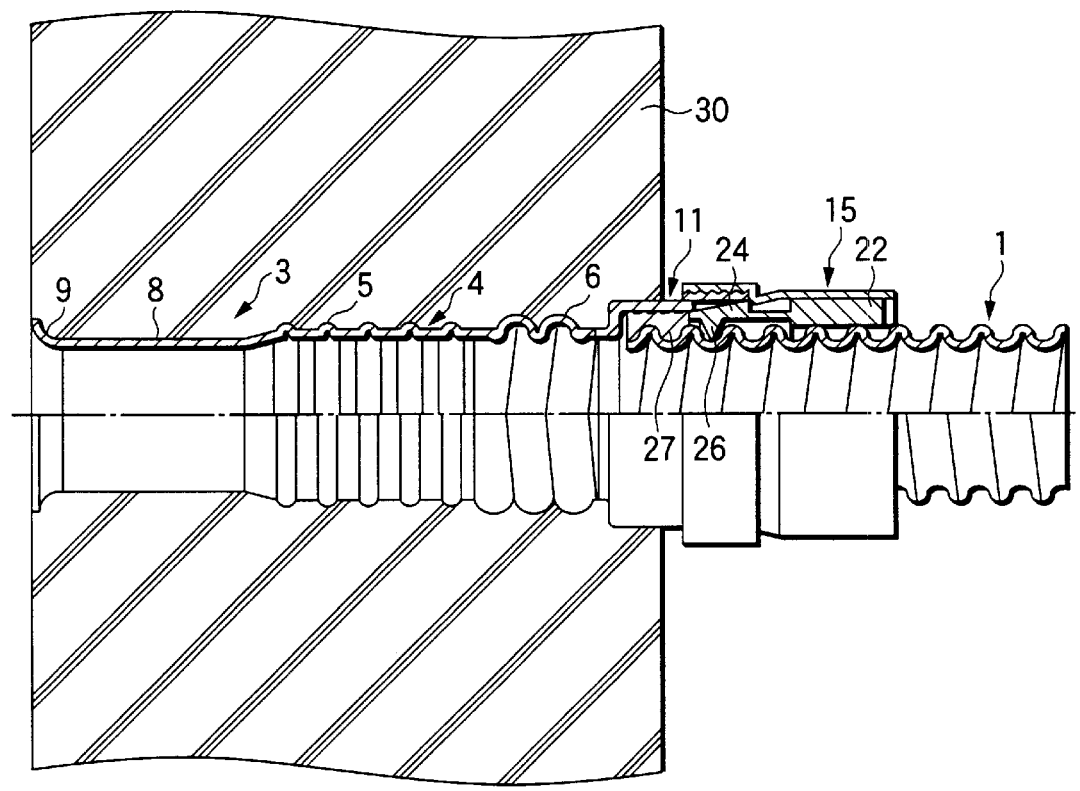
FIG. 4 shows a sectional view showing a state where the protection tube is coupled to the conduit opening member buried in a hand hole.
Figure 5:
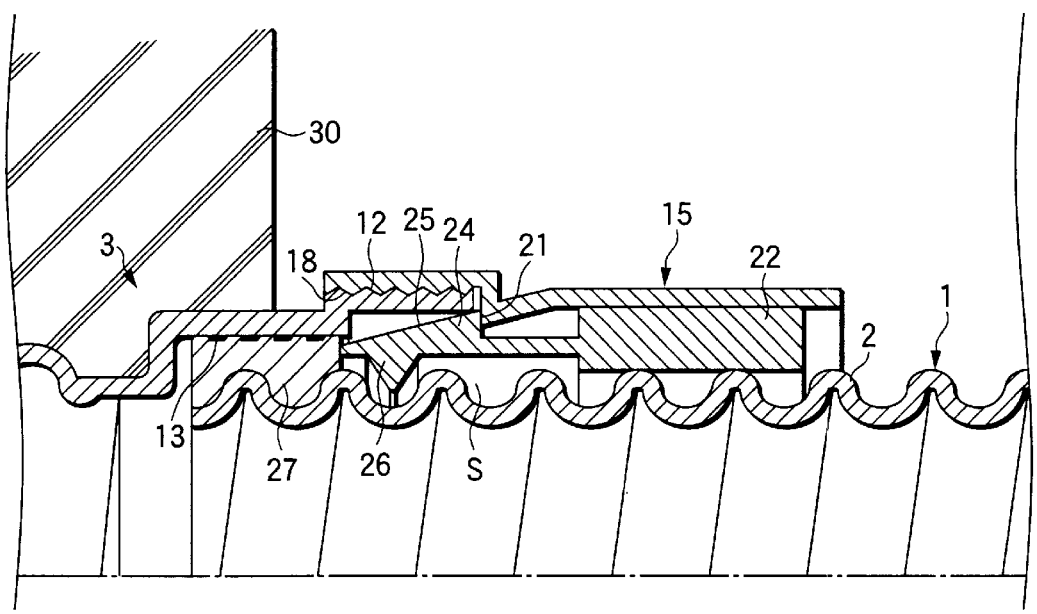
FIG. 5 shows an enlarged diagram of a main portion in FIG. 4.

The protection tube 1 is coupled to the conduit opening member after the concrete of the side wall 30 is hardened. First, as shown in FIG. 3, an integration unit of the ring 22 and the member 24 is fitted from the supporting ring 22 side on the outer periphery of the protection tube 1 at the end portion of the coupling side of the protection tube 1. Further, the projections 26 of the come-out preventing members 24 are fitted into the groove between the portions 2 of the protection tube 1 and are meshed with the groove while being rotated, whereby the integration unit is attached to the protection tube. Thereafter, the packing 27 is fitted on and attached-to the outer periphery of the tip end of the protection tube 1 such that the spiral groove 28 is fitted to the projection portion 2. In this case, in order to facilitate the attachment procedure of the packing, the come-out preventing members 24 are moved backward toward the inside from the normal position, then after the attachment of the packing 27 the come-out preventing members are rotated in a direction opposite to the screwing direction to be moved to the tip end side of the protection tube, and as shown in FIG. 2 the tip ends of the members 24 are abutted against the end surface of the packing 27.

Figure 6:
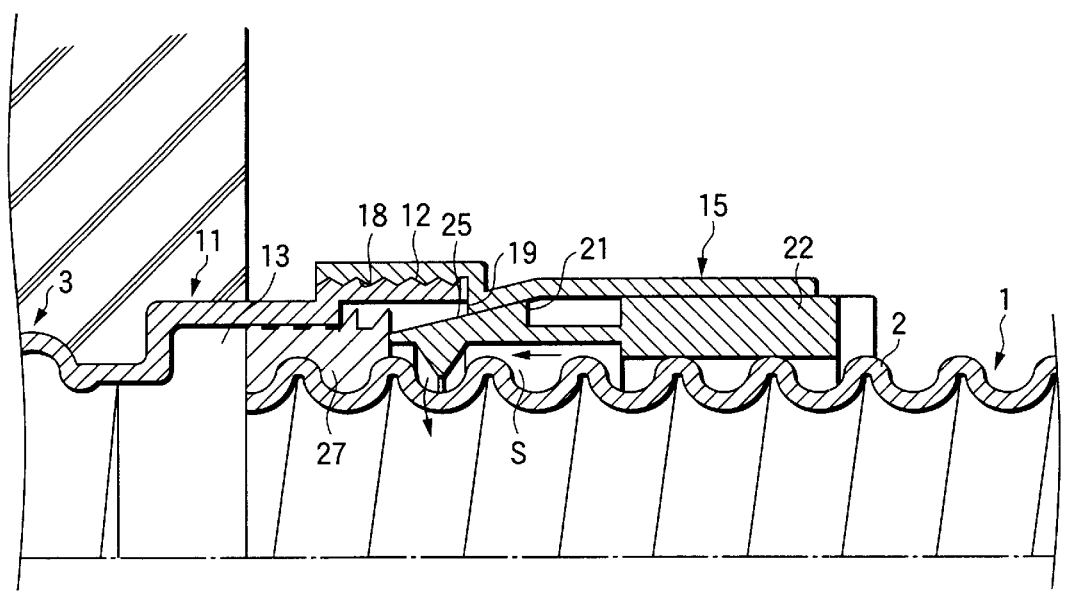
FIG. 6 shows an enlarged sectional view of a main portion showing a state where the protection tube is being inserted into the conduit opening member.

The-protection tube 1 to which the come-out preventing members 24 and the packing 27 are attached in the aforesaid manner is inserted from the packing 27 side into the end portion of the small diameter portion 17 side of the engaging member 15 and then pushed in until the packing 27 enters into the packing housing portion 13 within the large-diameter cylindrical portion 11 of the conduit opening member 3, as shown in FIG. 2. On the way of the pushing procedure, as shown in FIG. 6, the slanted surface 25 on the outer periphery of the come-out preventing member 24 abuts against the engagement projection 19 of the engaging member 15. When the protection tube is further pushed in this state, the come-out preventing members 24 slide while being bend inward due to the elasticity of the come-out preventing members 24 in accordance with the action of the slanted surface 25 thereof. Finally, in the stage where the packing 27 is pushed within the packing housing portion 13 in a watertight, the come-out preventing members 24 restore and an engagement portion 21 which is the end surface on the rear surface side of the come-out preventing member 15 engages with the inner side of the engagement projection 19, whereby the come-out preventing member is held so as not to come out.

The come-out preventing member is engaged only with respect to the axial direction of the tube and not engaged with respect to the circumferential direction. Thus, in such an engagement state, the come-out preventing member 24 and the engaging member 15 are rotatable mutually, so that the engaging member 15 can be removed from the conduit opening member 13 by rotating the engaging member 15 to thereby cancel the meshing state between the screws 12 and 18.

In this manner, in a state where the packing 27 and the members 24 are attached to the protection tube, the protection tube 1 can be coupled to the conduit opening member by the one-touch operation by merely pushing the protection tube to the conduit opening member 3 side.

In this respect, in order to allow the come-out preventing member 24 to bend inward as described above, a margin gap S is provided between the inner surface side of the engaging member 15 and the external surface side of the protection tube 1. Although the come-out preventing member 24 likely falls down in the axial direction due to the presence of the margin gap S, the supporting ring 22 which inner surface is formed in a straight fashion serves as a supporting member for preventing the falling-down of the come-out preventing member.

At the time of the aforesaid pushing operation, the tip end of the come-out preventing member 24 abuts against the end face on the rear surface side of the packing 27 to thereby support the packing 27 form the rear portion side along the pushing direction. Further, the come-out preventing member 24 is meshed with the protection tube 1 and so restricted in its position not to move in the axial direction. Accordingly, the packing 27 is prevented from moving in the axial direction with respect to the protection tube 1 due to the sliding resistance at the time of the pushing operation and so the packing can be surely pushed within the packing housing portion 13.

Figure 7:
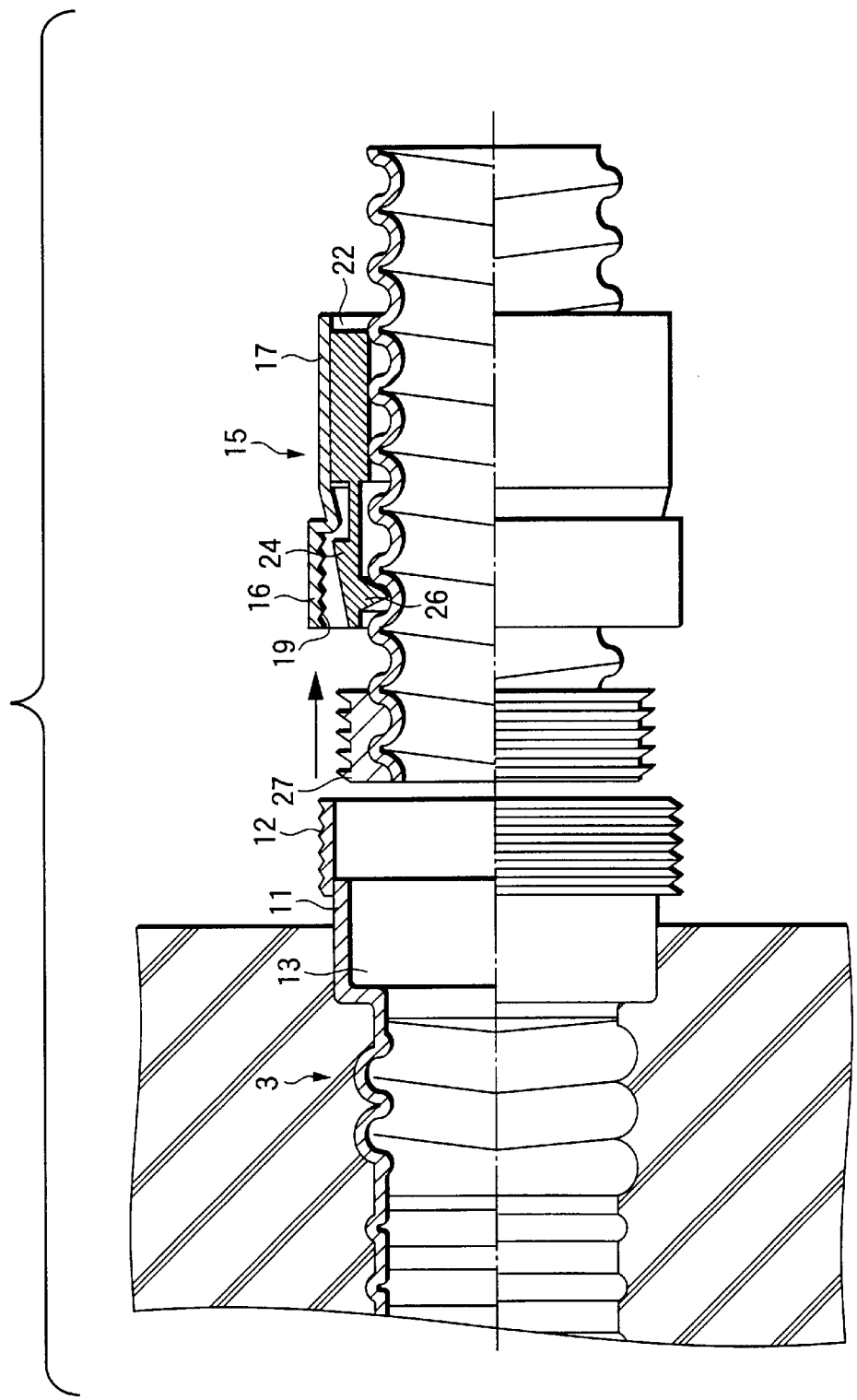
FIG. 7 shows a sectional view of a main portion showing a state just after an engaging member is separated and the protection tube is drawn out of the conduit opening member.

As described above, the engaging member 15 is rotatable after coupling the protection tube 1 to the conduit opening member. Thus, when the engaging member 15 is rotated in such a direction of releasing the meshing state with the male screw 12 of the conduit opening member 3, partially the come-out preventing members 24 rotate together with the engagement member, as shown in FIG. 7, the engagement member can be drawn to the protection tube 1 side. Then, the protection tube can be removed by drawing the protection tube 1 from the conduit opening member 3. Accordingly, even when there is any problem after coupling the protection tube to the conduit opening member, the coupling state therebetween can be cancelled easily to restore the original state, so that the maintenance can be facilitated.

Figure 8:
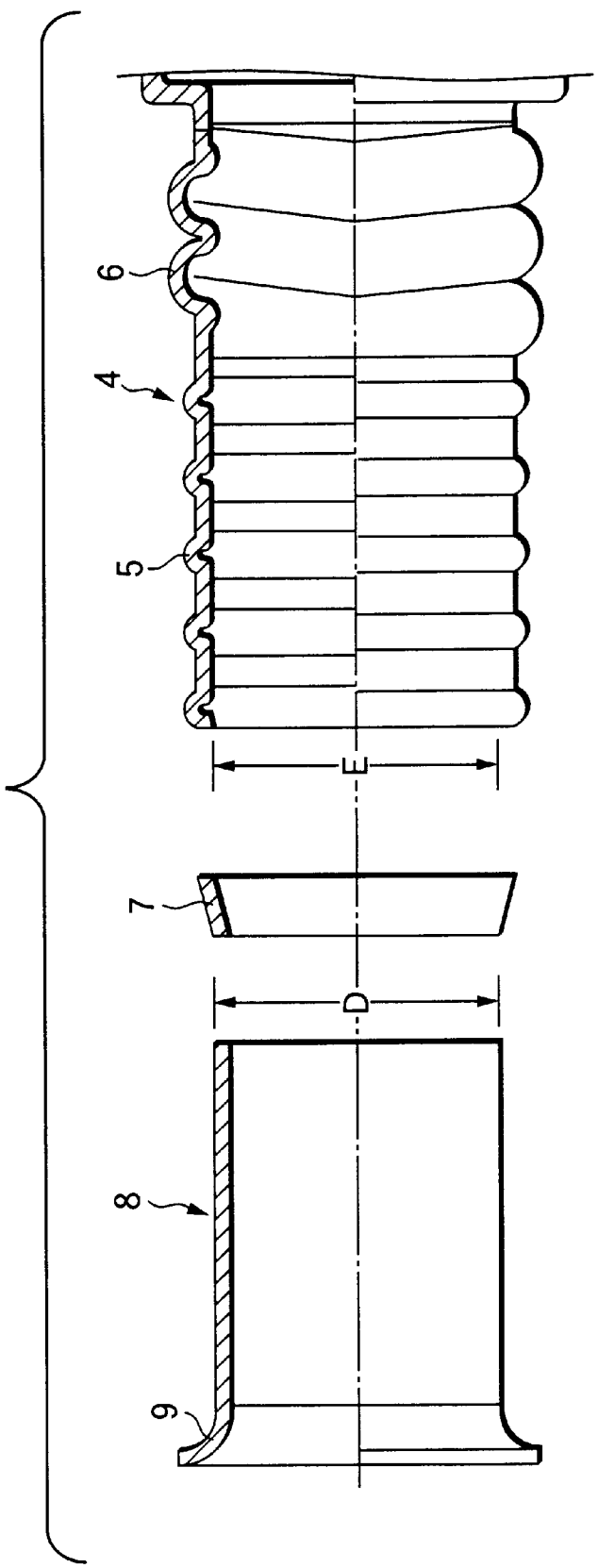
FIG. 8 shows a sectional view showing a state where the conduit opening member is cut and separated so as to make coincide with the thickness of the side wall of the hand hole.
Figure 9:
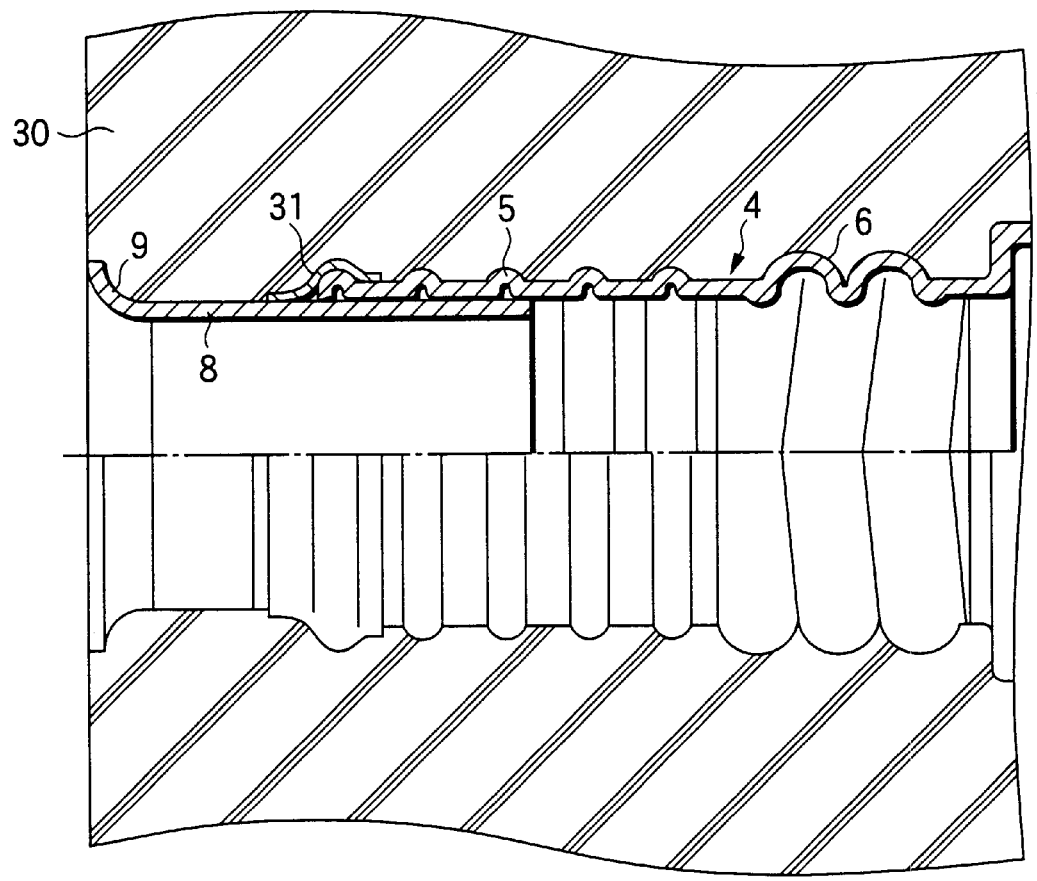
FIG. 9 shows a sectional view showing a state where the divided members divided in FIG. 7 are coupled again.

FIGS. 8 and 9 show a case where the thickness of the hand hole side wall 30 is small as compared with the length of the conduit opening member 13- In this case, when the tapered step portion 7 is cut at the both sides thereof between the straight portion 8 and the main body portion 4, the conduit opening member is divided in two units in a state that the tapered step portion 7 is removed. Then, as shown in FIG. 9, the end portion or the cut-out side of the straight portion 8 is inserted within the end portion of the main body portion 4 by a necessary length so as to adjust the length such that the inserted length of the end portion of the straight portion fit to the thickness of the side wall 30 to be buried.

To be more concrete, the outer diameter D of the straight portion 8 is slightly smaller than the inner diameter E on the cut-out side of the main body portion 4, so that the straight portion 8 can be inserted within the main body portion 4 thus separated with a little gap therebetween. In-such an insertion state, an adhesive or stick tape 31 is wound in a sealed state so as to extend between the main body portion 4 and the straight portion 8 to thereby couple integrally them and these portions thus integrated are buried within the side wall 30.

Figure 10:
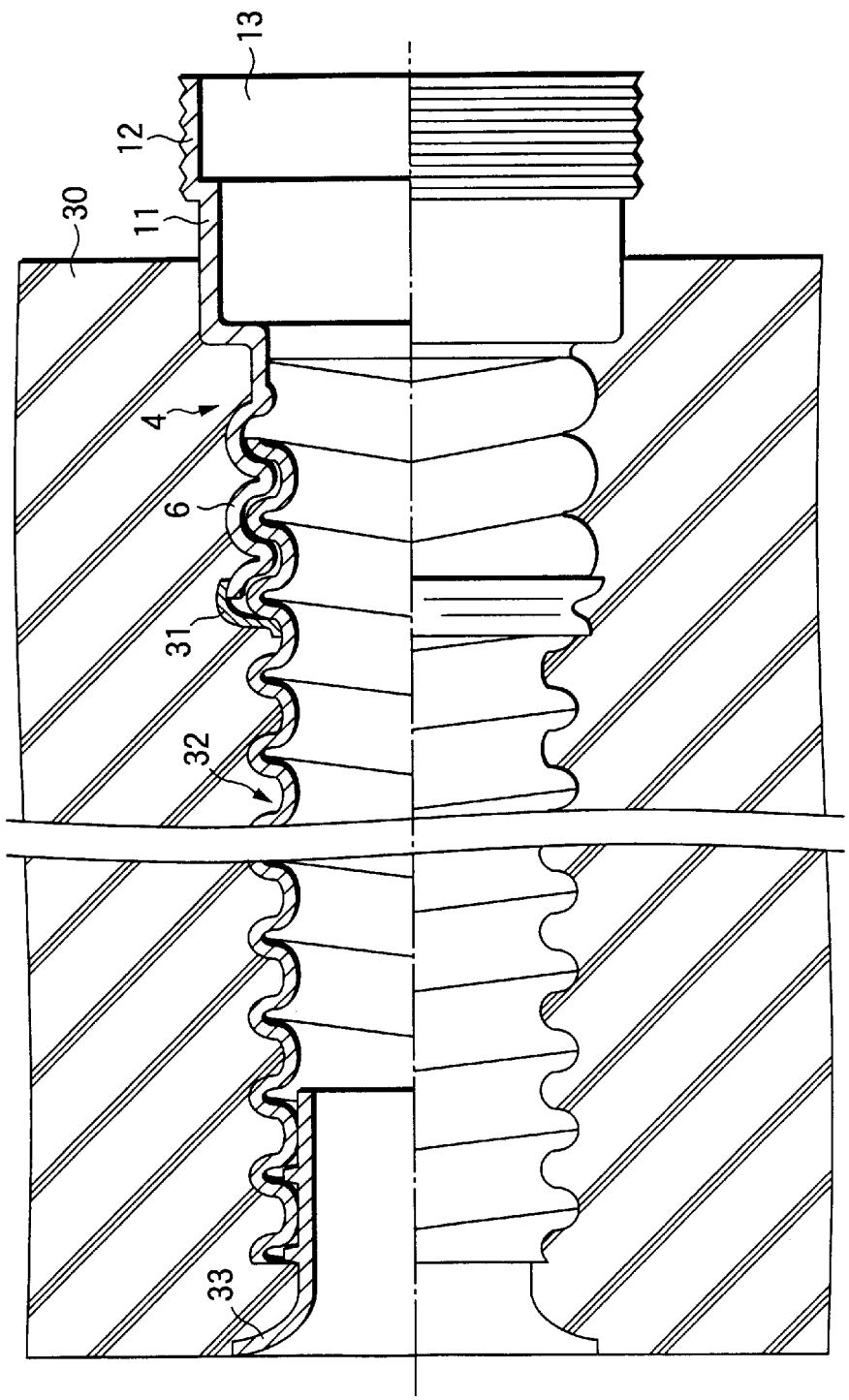
FIG. 10 shows a sectional view showing a state where the tip end of the conduit opening member is cut, then a joint member is coupled to the bellmouth and buried within the side wall.

On the other hand, when the thickness of the side wall 30 is too large as compared with that of the conduit opening member 3, as shown in FIG. 10, the potion 4 is cut at the boundary between the portions having the spiral projection portion 6 and the annular projection portions 5 to thereby cut off the portion side having the annular projection portion 5. Thereafter, one end of a joint member 32 formed by a spiral corrugated tube is meshed with the inner side of the spiral projection portion 6 to extend the entire length of the conduit opening member so as to coincide with the length corresponding to the thickness of the side wall 30, then the spiral corrugated tube portion of another bellmouth 33 is attached to the tip end of the conduit opening member thus extended and the conduit opening member is buried. The protection tube 1 may be used as the joint member 31 by cutting the protection tube in a required length. In this case, the spiral pitch of the spiral projection portion 6-is set so as to be same as that of the protection tube 1, and further the inner diameter of the spiral projection portion is set to be slightly larger than the inner diameter of the protection tube 6 or the outer diameter of the spiral projection portion is set to be slightly smaller than the inner diameter of the protection tube 1 when the protection portion is fitted on the outer periphery of the spiral projection portion. The same tape as the aforesaid tape 31 is wound around the potion between the end portion of the main body portion 4 and the outer periphery of the joint member 32 to thereby integrate them and seal the gap therebetween.

Figure 11:
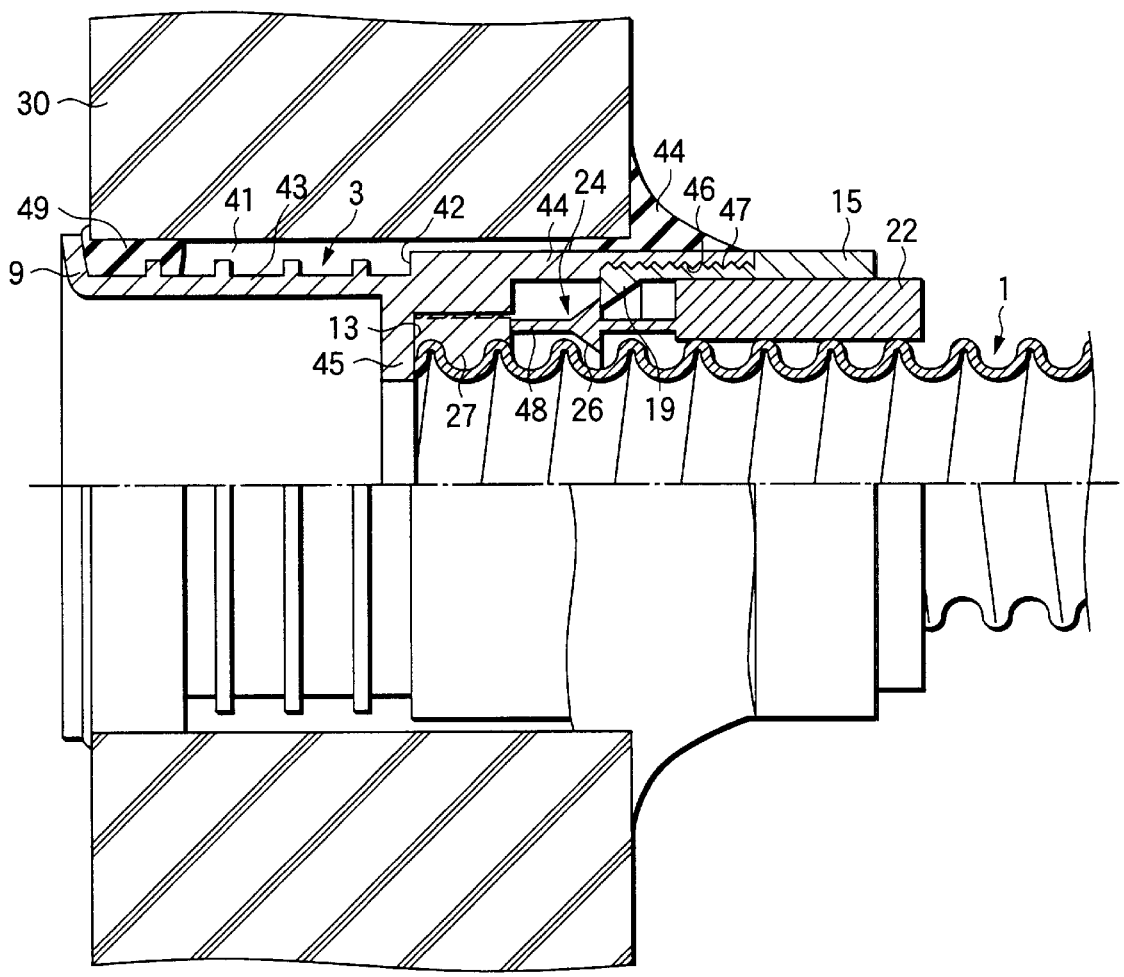
FIG. 11 shows a sectional view showing the coupling structure between a conduit opening member and a protection tube in a hand hole according to another embodiment of the invention.
Figure 12:
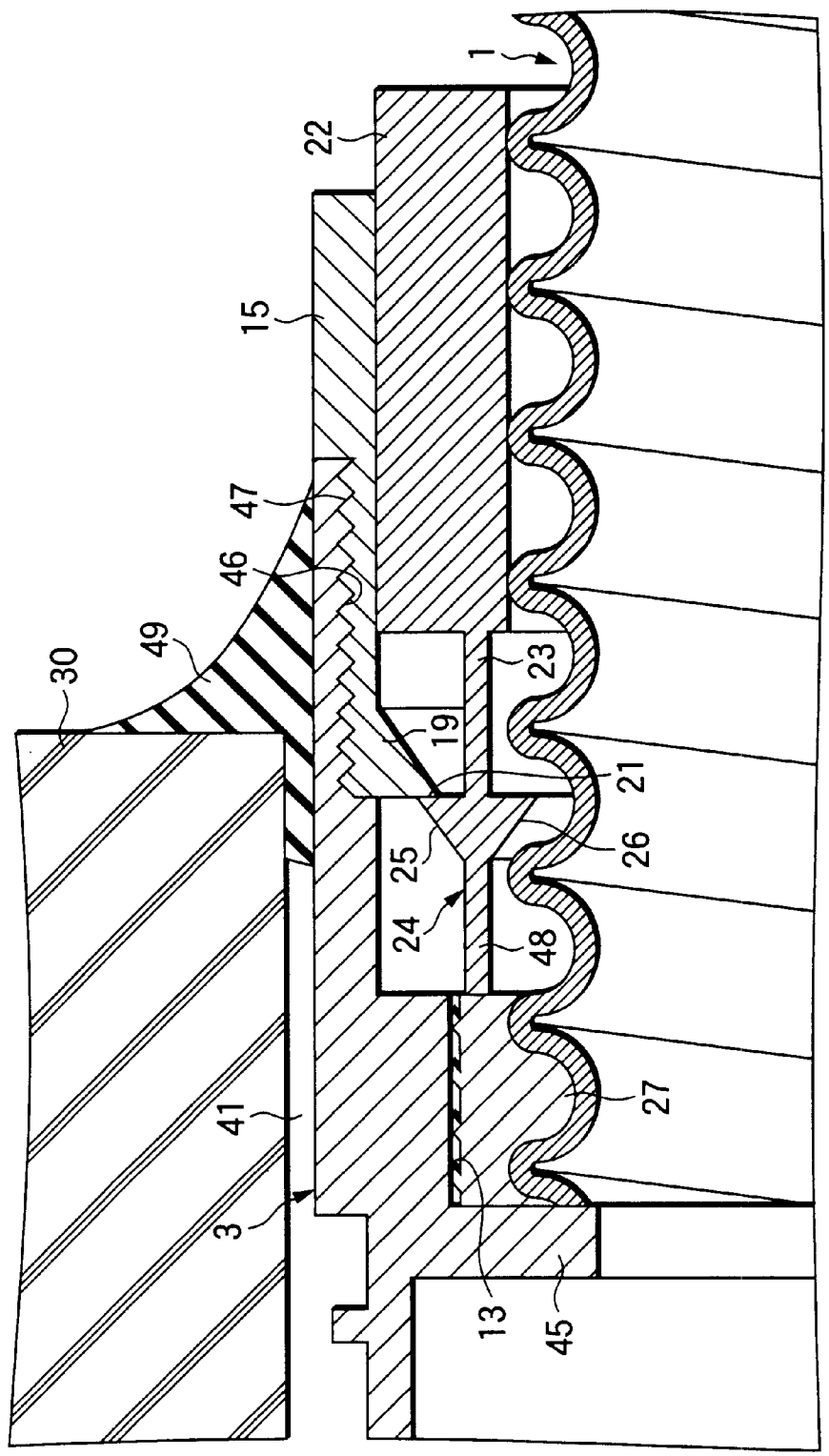
FIG. 12 shows an enlarged diagram showing a main portion in FIG. 11.
Figure 13:
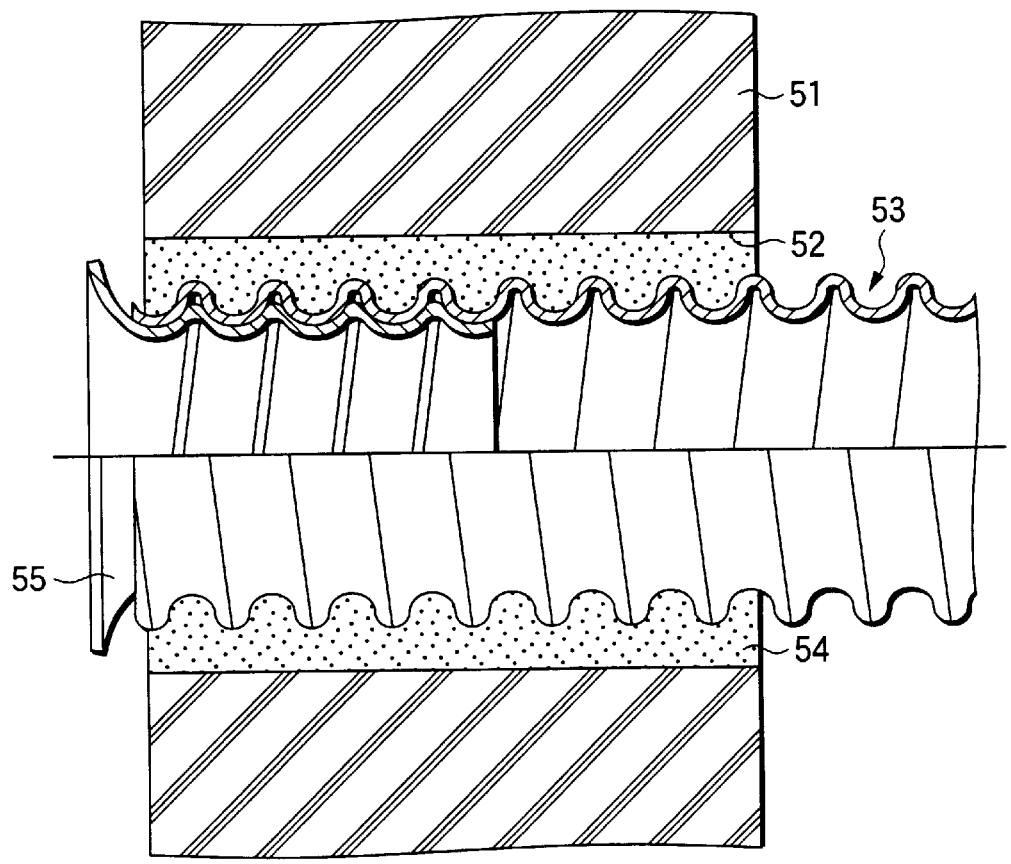
FIG. 13 shows a sectional view showing the conventional coupling structure of a protection tube to a hand hole.

FIGS. 11 and 12 show another embodiment of the invention, wherein a conduit opening member 3 is inserted into a through hole 41 which is formed in a side wall 30 of a hand hole in advance or formed at the construction site and then attached thereto.

The conduit opening member 3 is arranged in a manner that one half thereof with respect to a step portion 42 formed at the intermediate portion of the conduit opening member along the longitudinal direction thereof is formed as a corrugated tube portion 43 having a plurality of annular projection portions on the outer periphery thereof and the other half thereof is formed as a straight tube portion 44. A bellmouth 9 is integrally formed at the tip end of the corrugated tube portion 43. An annular flange 45 is formed at a portion on the inner peripheral surface almost corresponding to the step portion 42 The conduit opening member is formed as a packing housing portion 13 on the straight tube portion 44 side with respect to the flange 45. A female screw 46 is formed on the inner periphery of the straight tube portion 44 serving as the coupling side to the protection tube 1. A male screw 47 formed on the outer periphery of the tip end portion of an engaging member 15 is meshed with the female screw 46 so that the protection tube can be detachable from the conduit opening member. In this case, the outer periphery of the potion 44 is made substantially on the same surface as that of the engaging member 15. A hill-shaped engagement projection 19 is formed on the inner periphery of the tip end portion on the male screw 47 side of the portion 15.

The configuration of a supporting ring 22 and a come-out preventing member 24 is basically same as the aforesaid embodiment and a projection 48 for pushing a sealing member 27 is formed at the tip end portion of the come-out preventing member 24.

The conduit opening member 3 is inserted into the through hole 41 from the inner side of the side wall 30 such that the straight tube portion 44 side serves as the head. The tip end of the bellmouth 9 has a diameter larger than the inner diameter of the through hole 4land protrudes to the inner side from the inner wall surface of the side wall 30. Putty 49 is filled in a gap between the outer periphery of the bellmouth 9 and the through hole 41 to seal the gap portion in a watertight manner. On the other hand, the tip end of the conduit opening member 3 on the straight tube portion 44 side protrudes outward from the side wall 30. Putty 49 is also filled in a gap between the through hole 41 and the outer periphery on the end portion side of the conduit opening member to seal the gap in the similar manner.

The method of attaching the come-out preventing members 24 and the sealing member 27 to the protection tube 1 and the method of performing the coupling and removal between the protection tube 1 and the conduit opening member 3 are same as the aforesaid embodiment.

As a still another embodiment, a joint tube for jointing a pair of protection tubes 1,1 etc. may be used in place of the conduit opening member 3. In this case, in FIG. 11, when the joint tube is formed in such a manner that the right side portion of the conduit opening member 3 with. respect to the step portion 42 is also formed at the left side in a mirror reversed manner, the protection tubes 1, 1 respectively having the packing 27 and the come-out preventing members 24 can be inserted into the joint tube from the both sides and coupled to each other.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

As described above, according to the invention, since the first tube member can be coupled to the second tube member by merely performing one-touch operation of pushing the first tube member to the second tube member in the state where the come-out preventing member is attached to the tip end of the first tube member, the invention is advantageous in that the coupling procedure can be attained simply in a short time. In particular, when the second tube member is used as the conduit opening member to be buried in the side wall of a hand hole and the first tube member is used as the protection tube for a cable to be buried within the ground such as an electric wire cable, the coupling procedure of the protection tube to the hand hole can be simplified greatly as compared with the conventional coupling structure.

According to the invention, since the engaging member engaging the come-out preventing member can be separated from the second tube member, the first tube member can be removed from the second tube member by separating the engaging member. Thus, the invention is advantageous in that the coupling procedure executed again after the occurrence of failure in the coupled structure or the maintenance procedure can be performed. easily.

Further, according to the invention, since the packing is attached to the tip end of the first tube member, the coupling structure of the invention is excellent in watertightness and suitable for the coupling member for a tube for a hand hole.

In addition, according to the invention, since the tip end of the come-out preventing member abuts against the end surface of the packing to thereby support the packing so as not to move to the rear portion side thereof along the pushing direction, there does not occur such a problem that the packing moves upon the pushing operation to thereby degrade the watertightness.

What is claimed is:

1. A coupling structure for a tube having first and second tube members, said structure comprising:
   a come-out preventing member adapted to be held at an outer periphery of said first tube member; and
   an engaging member adapted to protrude from an end portion on a coupling side of said second tube member,
   wherein said come-out preventing member and said engaging member are respectively provided with first and second engaging portions to engage said come-out preventing member and said engaging member to each other and to prevent said first and second tube members from being separated from each other, and wherein at least one of said first and second engaging portions has elasticity with respect to a radial direction of said tube or elastically supported so that said first and second engaging portions are placed in an engaged state to each other due to the elasticity of said at least one of said first and second engaging portions when said come-out preventing member is pushed into said engaging member, wherein said engaging member is threadedly engaged with said second tube member so as to be separatable from said second tube member in a state where said engaging member and said come-out preventing member are engaged with each other.

2. The coupling structure for a tube according to claim 1, further comprising:

a packing adapted to be housed in a packing housing portion of said second tube member in a state where said packing is fitted on an outer periphery of said tip end portion on said coupling side of said first tube member, wherein said come-out preventing member is attached to an inner side of said packing away from said tip end portion in said longitudinal direction of said first tube member.

3. The coupling structure for a tube according to claim 2, wherein the tip end of said come-out preventing member is brought in contact with an end surface of said packing, to thereby support said packing from a rear portion side thereof along a pushing direction when said packing is pushed within said packing housing portion of said second tube member.

4. The coupling structure for a tube according to claim 1, wherein said first tube member comprises a spiral corrugated tube having a spiral-shaped projection on the outer periphery thereof, wherein said spiral corrugated tube is arranged in a manner that said come-out preventing member meshes with said spiral-shaped projection to restrict the movement of said come-out preventing member in the longitudinal direction of said tube member.

5. The coupling structure for a tube according to claim 1, wherein said engaging member is threadedly engaged with and attached to said end portion on said coupling side of said second tube member when said engaging member is coupled with said come-out preventing member, and wherein said engaging member can be separated from said end portion on said coupling side by releasing the threadedly engaged state.

6. The coupling structure for a tube according to claim 6, wherein said engaging member is threadedly engaged with and attached to said end portion on said coupling side of said second tube member when said engaging member is coupled with said come-out preventing member, and wherein said engaging member can be separated from said end portion on said coupling side by releasing the threadedly engaged state.

7. The coupling structure for a tube according to claim 1, wherein said first tube member comprises a cable protection tube for an electric wire cable and is buried within ground, and said second tube member comprises a conduit opening member which is buried in a side wall of a hand hole made of concrete and serves to introduce said cable passed through said first tube member within said hand hole.

8. The coupling structure for a tube according to claim 4, wherein said first tube member is a cable protection tube for an electric wire cable and is buried within ground, and said second tube member is a conduit opening member which is buried in a side wall of a hand hole made of concrete and serves to introduce said cable passed through said first tube member within said hand hole.

9. The coupling structure for a tube according to claim 5, wherein said first tube member is a cable protection tube for an electric wire cable and is buried within ground, and said second tube member is a conduit opening member which is buried in a side wall of a hand hole made of concrete and serves to introduce said cable passed through said first tube member within said hand hole.

10. The coupling structure for a tube according to claim 6, wherein said first tube member is a cable protection tube for an electric wire cable and is buried within ground, and said second tube member is a conduit opening member which is buried in a side wall of a hand hole made of concrete and serves to introduce said cable passed through said first tube member within said hand hole.

11. The coupling structure for a tube according to claim 1, wherein said engaging member is threadedly engaged with said second tube member so as to be separatable from said second tube member by rotating said engaging member relative to said second tube member in a state where said engaging member and said come-out preventing member are engaged to each other.

12. The coupling structure for a tube according to claim 1, wherein said first tube member comprises a spiral corrugated tube having a spiral-shaped projection on the outer periphery thereof, wherein said spiral corrugated tube is arranged in a manner that said come-out preventing member meshes with said spiral-shaped projection to restrict the movement of said come-out preventing member in the longitudinal direction of said tube member.

13. The coupling structure for a tube according to claim 2, wherein said first tube member comprises a spiral corrugated tube having a spiral-shaped projection on the outer periphery thereof, and wherein said spiral corrugated tube is arranged in a manner that said come-out preventing member meshes with said spiral-shaped projection to restrict the movement of said come-out preventing member in the longitudinal direction of said tube member.

14. The coupling structure for a tube according to claim 3, wherein said first tube member comprises a spiral corrugated tube having a spiral-shaped projection on the outer periphery thereof, and wherein said spiral corrugated tube is arranged in a manner that said come-out preventing member meshes with said spiral-shaped projection to restrict the movement of said come-out preventing member in the longitudinal direction of said tube member.

15. The coupling structure for a tube according to claim 1, wherein said engaging member is threadedly engaged with and attached to said end portion on said coupling side of said second tube member when said engaging member is coupled with said come-out preventing member, and wherein said engaging member can be separated from said end portion on said coupling side by releasing the threadedly engaged state.

16. The coupling structure for a tube according to claim 2, wherein said engaging member is threadedly engaged with and attached to said end portion on said coupling side of said second tube member when said engaging member is coupled with said come-out preventing member, and wherein said engaging member can be separated from said end portion on said coupling side by releasing the threadedly engaged state.

17. The coupling structure for a tube according to claim 2, wherein said engaging member is threadedly engaged with and attached to said end portion on said coupling side of said second tube member when said engaging member is coupled with said come-out preventing member, and wherein said engaging member can be separated from said end portion on said coupling side by releasing the threadedly engaged state.

18. The coupling structure for a tube according to claim 1, wherein said first tube member comprises a cable protection tube for an electric wire cable and is buried within ground, and said second tube member comprises a conduit opening member which is buried in a side wall of a hand hole made of concrete and serves to introduce said cable passed through said first tube member within said hand hole.

19. The coupling structure for a tube according to claim 2, wherein said first tube member comprises a cable protection tube for an electric wire cable and is buried within ground, and said second tube member comprises a conduit opening member which is buried in a side wall of a hand hole made of concrete and serves to introduce said cable passed through said first tube member within said hand hole.

20. The coupling structure for a tube according to claim 1, wherein said come-out preventing member is held at said outer periphery of said first tube member such that said come-out preventing member is immovable in a longitudinal direction of said first tube member.

* * * * *